United States Patent [19]
Boehringer et al.

[11] 3,759,468
[45] Sept. 18, 1973

[54] EXTENDIBLE GEAR AXLE
[75] Inventors: Wilfred E. Boehringer; Donald C. Callas, both of Fullerton, Calif.
[73] Assignee: McDonnell Douglas Corporation, Santa Monica, Calif.
[22] Filed: Mar. 1, 1971
[21] Appl. No.: 119,746

[52] U.S. Cl. .............................. 244/102 R
[51] Int. Cl. .............................. B64c 25/14
[58] Field of Search ................ 244/103 R, 104 R, 244/102 R, 100 R, 50; 280/34 R, 29, 80 R; 301/128

[56] References Cited
UNITED STATES PATENTS
3,244,385  4/1966  Fehring et al. ............... 244/103 R
2,763,449  9/1956  Fullam et al. ............... 244/50

FOREIGN PATENTS OR APPLICATIONS
684,388  12/1952  Great Britain ............ 244/103 R Primary Examiner—Milton Buchler
Assistant Examiner—Paul E. Sauberer
Attorney—Walter J. Jason, Donald L. Royer and Robert O. Richardson

[57] ABSTRACT

An extendible axle to provide for increase aircraft gross weight without increasing gear stowage area or runway concrete stresses. Spacing between tires increases when the gear is down and decreases when stowed within the aircraft wheel well.

8 Claims, 4 Drawing Figures

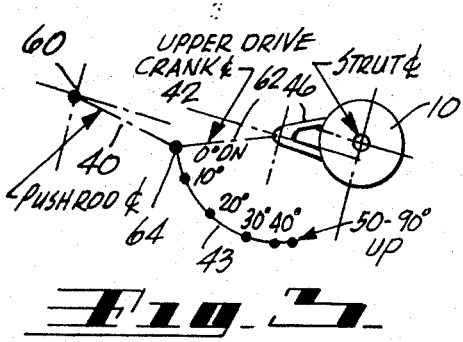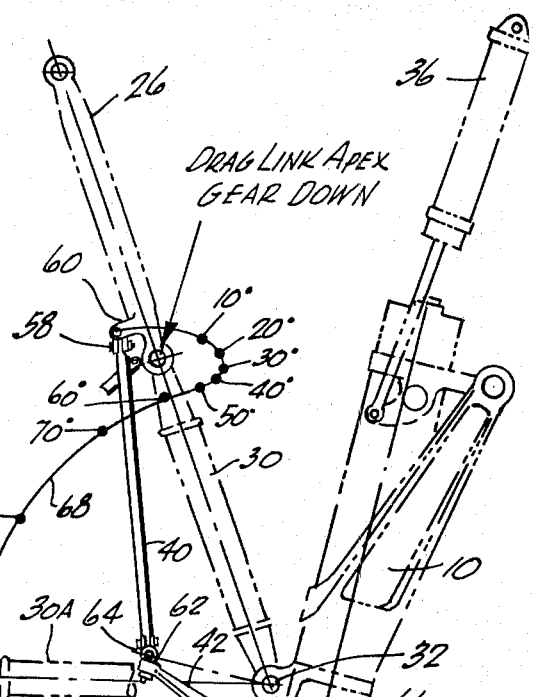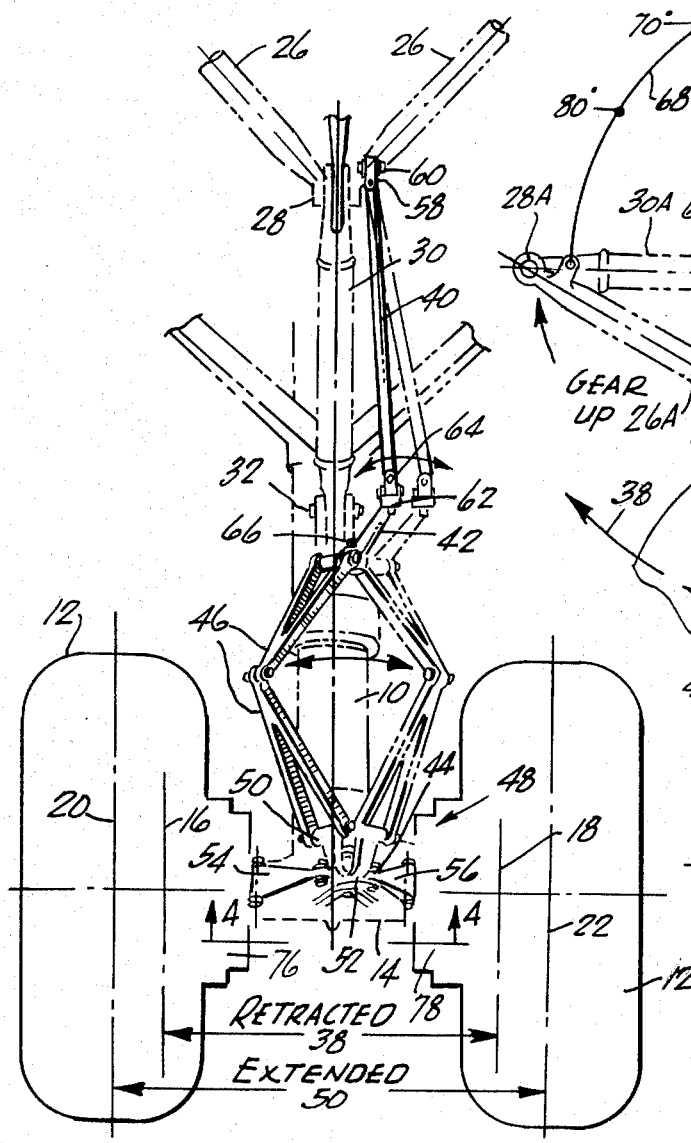

EXTENDIBLE GEAR AXLE

BACKGROUND OF THE INVENTION

In modern aircraft, in order to have best flying efficiency, the landing gear and wheels are retracted into wheel wells within the aircraft after the aircraft has taken off and is in flight. Just prior to landing, the landing gear is then extended below the aircraft to support the aircraft on landing and movement while on the ground. As aircraft gross weights are increased, there is a need to distribute this weight over a larger area of the runway concrete. At the same time, it is desirable to have a minimum envelope for gear stowage.

In a British patent no. 684,388, published Dec. 17, 1952 for improvements in the mounting of aircraft landing wheels, the Goodyear Aircraft Corporation describes a mechanically extendible axle. It employs a cargo link arrangement in which the amount of the wheel spread is limited by the size of the mechanism that can be installed inside the housing. U.S. Pat. No. 3,244,385 for a vehicle soft field wheeled supporting gear, issued Apr. 5, 1966, to Fehring et al. This patent shows controllable axially extendible; axles depending on the pressurized direction of a hydraulic cylinder housed inside the axles for extending and retracting the wheel spacing;. This patent does not show a means for locking the axle in its extended position, other than through the use of trapped pressurized fluid. This design results in a weight penalty because of the large cylinder needed to react to the side loads. Environmental conditions for a hydraulic cylinder inside an axle are poor, brake heat will deteriorate the hydraulic fluid and the elastomer seals. Positive sequencing and interlocking with gear retraction is not shown in either patent and would be; a problem with these concepts.

SUMMARY OF THE PRESENT INVENTION

The present invention relates to an extendible aircraft landing gear axle with a wheel mounted on each end of said axle. A purely mechanical system harnesses the motion from the centerline gear upper drag link to extend or retract the axle during the gear positioning cycle. Motion is transmitted from the drag link through a pushrod to rotate an upper drive crank. The upper drive crank, in turn, rotates a scissor link which drives the lower lock linkage. Rotation of the lower lock linkage extends or retracts the axle along its length, transversely of the aircraft. The linkage in the extended mode is on center to accept the side load reactions. When the landing gear is in the full wheels-up position the axle is the shortest and the wheels are closest together thus presenting a minimum envelope for gear stowage. Conversely when the landing gear is in the full wheels-down position the axle is longest and the wheels are furthest apart. In this position of increased tire spacing, runway stresses are reduced. By careful choice of the kinematics the linkage is made to dwell during the first half of the extension cycle thus allowing the wheels to clear aircraft structure before the axle is extended.

The extendible gear axle of the present invention, by having an external sleeve arrangement with an external drive, may accommodate any length of desired extension and provides for positive sequencing and interlocking with gear retraction automatically by mechanical drive of toggle links powered from the gear retraction, making this mechanical system far more reliable.

BRIEF DESCRIPTION OF THE DRAWINGS

FIG. 1 is a side view of the landing gear in extended position with a fragmentary view of the linkage when the gear is in up position;

FIG. 2 is a front view showing the landing gear in the down position with the wheels extended;

FIG. 3 is a schematic illustration showing rotation of the upper drive crank upon actuation by the pushrod.

Figure 4:
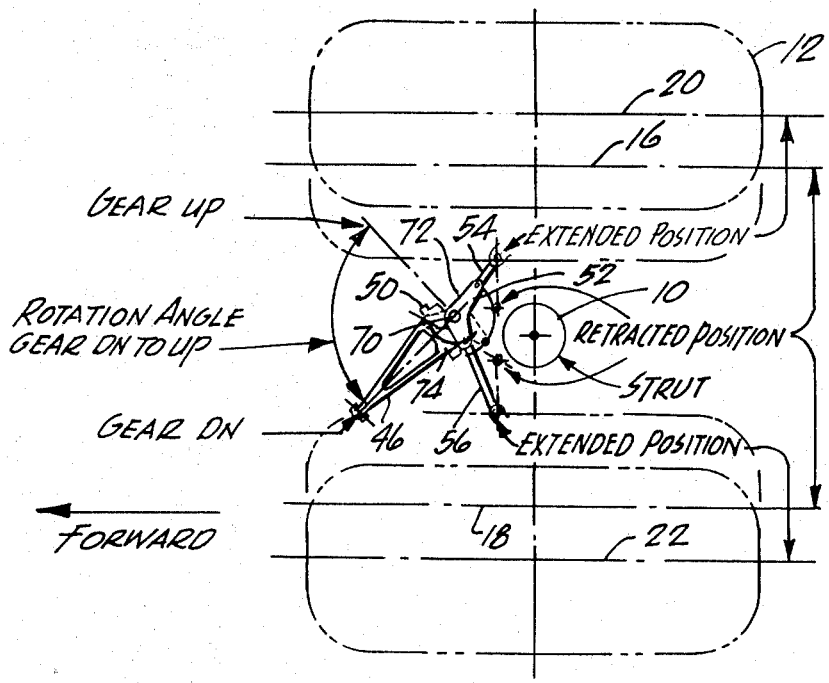
FIG. 4 is a plan view taken along the line 4—4 of FIG. 2.

Reference is now made to FIG. 1 and FIG. 2 wherein there is shown a landing gear strut 10 adapted to support wheels 12 on axle 14. As in most conventional struts, there is a telescopic action in shock absorption and the strut 10 may become foreshortened upon touchdown and upon the wheels going over a bump on the runway. Convention linkage 15 on the strut 10 is used in connection with this purpose. Wheels 12 are mounted in axle 14 telescopically for lateral movement from a retracted position shown by centerlines 16, 18 to an extended position shown by centerlines 20, 22. In one embodiment the distance between the centerlines in the retracted position 16, 18 is 38 inches and the distance between the centerlines in extended position 20, 22 is 50 inches. The linkage in the present invention is designed to retract the wheels to the retracted distance 16, 18 on the axle 14 when the wheels are retracted into the wheel well, not shown, and to position the wheels in their extended position 20, 22 when the landing gear is down. The wheels are in extended position and the landing gear is down in both FIG. 1 and FIG. 2.

The lateral movement between the wheels is initiated through action of a pair of drag links 26 which have their upper ends pivotally mounted within the wheel well, not shown. These links terminate at their lower end at a pivot point connection 28 with a lower drag link 30 which, in turn, is pivotally attached to the strut 10 at pivot point 32. An appropriate actuator 36 will cause retraction of the strut and wheels into the wheel well. When this is done, the position of the upper drive links 26 and centerline link 30 assume the position shown as 26A and 30A in FIG. 1, and the pivot point 28 is positioned at point 28A. On retraction, the wheel 12 is moved in the direction of arrows 38.

The linkage for effecting lateral movement of the wheels is a pushrod 40, upper drive crank 42, mounting bracket 44, scissor links 46, and lower lock linkage 48 comprising a lever 50, bellcrank 52, and links 54 and 56. Pushrod 40 is pivotally mounted at its upper end in a universal manner through a clevis 58 to an ear 60 on the lower end of one of the upper drag links 26. Upper drive crank 42 is pivotally mounted on mounting bracket 44 which is affixed to strut 10. The outer end 62 of crank 42 is universally connected through clevis 64 to the lower end of pushrod 40.

As can be seen in FIGS. 2 and 3, the lower end of pushrod 40 is canted out of alignment between ear 60 and the pivotal connection 66 between bracket 44 and upper drive crank 42. This permits out of plane movement of the pushrod when subjected to axial tension or compression. Thus, a downward push on pushrod 40 causes upper drive crank 42 to pivot to the right, as seen in FIG. 2. This downward push or compressive force on pushrod 40 occurs when the landing gear is raised into the wheel well, not shown. This is evidenced by the foreshortening of the distance between ear 60 and pivot point 32 as the gear is raised. (It may be noted in FIG. 1 that when the gear is down, ear 60 is farther from pivot 32 than pivot 28 is but in the gear up position the ear is closer. Between these positions the path of ear 60 follows line 68. Since pivot 28 is always a fixed distance from pivot 32, ear 60 is closer in the gear up position and hence a compressive force is exerted on pushrod 40 as the landing gear is being retracted into the wheel well).

When the landing gear is dropped from the wheel well and is lowered to its gear down position, there is a tension or pull on the pushrod 40 as the distance between ear 60 and pivot point 32 is increased. This force pulls the lower end of the pushrod 40 to the left as seen in FIG. 2, also pivoting upper drive crank 42 to the left. As can be seen by the position line 43 of the lower end of pushrod 40 in FIG. 3, the retraction of the wheel spacing is done during the first 50° of strut movement from gear down position to gear up position. Hence, full retraction of the wheels is accomplished well in advance of their movement into the wheel well.

Having now established that, as seen in FIG. 2, the upper drive crank 42 pivots to the right when the landing gear is retracted into the wheel well and it pivots to the left when the landing gear is dropped down to landing position, the structure connected to the crank 42 for moving the wheels 12 laterally should next be described. Because of the axial elongation and compression of strut 10 the pivotal action of upper drive crank 42 is transferred to a lower bellcrank lever 50 by means of scissor links 46 which are pivotally mounted to compensate for this axial movement. The lower end of scissor links 46 is pivotally connected to the outer end of lever 50 which actuates bellcrank 52 which, in turn, is pivotally mounted on axle 14 at pivot point 70. Bellcrank 52 has arms 72, 74 (shown in FIG. 4) to which links 54 and 56 respectively are connected. The outer ends of links 54, 56 are connected to telescopic portions 76, 78 of axle 14 and, with the wheels 12 mounted on these portions, wheels 12 move laterally together and apart as the bellcrank is rotated.

Having thus described illustrative embodiments of this invention, it is to be understood that other variations are possible and that these deviations from the embodiments just described are to be considered as part of the present invention.

We claim:

1. An extendible landing gear axle for an aircraft wherein a strut is movable between a landing gear up and wheels in the well position for aircraft flight and a gear down position for aircraft takeoff and landing, an extendible axle on said strut with wheels on extendible portions of said axle for varied spacing therebetween, mechanical means operable after said wheels have dropped down from their wheel well position to exand the spacing between wheels, said mechanical means also being operable to reduce the spacing between wheels as said strut is being returned to its gear up position, said spacing being reduced to its minimum before said wheels are returned to their well in the wheel well position.

2. An extendible landing gear axle as set forth in claim 1 wherein said mechanical means responds to strut movement in imparting a pivotal movement to a bellcrank, said bellcrank being operable upon rotation to vary said spacing between said wheels.

3. An extendible landing gear axle as set forth in claim 1 wherein said means includes a pushrod operatively connected to exert a downward force with a lateral component upon lowering of said strut, and a pivotal means responsive to said lateral component of pushrod downward force movement for increasing the spacing of said wheels.

4. An extendible landing gear axle as set forth in claim 1 wherein a pushrod exerts an upward force with a lateral component upon raising of said strut, and a pivotal means responsive to said lateral component of pushrod upward force for decreasing the spacing of said wheels.

5. An extendible landing gear axle as set forth in claim 2 wherein said axle has extendible portions upon which said wheels are mounted, and links connect said extendible portions to the arms of said bellcrank whereby rotation of said bellcrank changes the spacing between said wheels.

6. An extendible landing gear axle as set forth in claim 3 wherein said pivotal means is a bellcrank operable by a crank, said pushrod extending in out of plane alignment between a downward compressive force exerted at the top thereof and the pivotal connection of said crank which is spaced downwardly and laterally from the top of said pushrod, said pushrod being pivotally connected to said crank at a point spaced from the pivotal connection of said crank whereby downward movement of said pushrod imparts a lateral force on said crank to achieve pivotal movement thereof.

7. An extendible landing gear axle as set forth in claim 3 wherein said pivotal means is a bellcrank operable by a crank, said pushrod being pivotally connected at its lower end to said crank, said pushrod extending upwardly and laterally from said lower end whereby a downward force on said pushrod exerts a lateral force on said crank to provide pivotal movement thereof in one direction.

8. An extendible landing gear axle as set forth in claim 7 and wherein an upward force on said pushrod exerts a lateral force on said crank to provide pivotal movement thereof in the opposite direction.

* * * * *